US008369373B2

(12) United States Patent  
Allie et al.

(10) Patent No.: US 8,369,373 B2  
(45) Date of Patent: Feb. 5, 2013

(54) PRE-IONIZATION METHOD FOR $CO_2$ GAS-DISCHARGE LASER

(75) Inventors: David John Allie, Storrs, CT (US); Joel Fontanella, Tolland, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 12/729,394

(22) Filed: Mar. 23, 2010

(65) Prior Publication Data

US 2011/0085580 A1  Apr. 14, 2011

Related U.S. Application Data

(60) Provisional application No. 61/251,207, filed on Oct. 13, 2009, provisional application No. 61/258,497, filed on Nov. 5, 2009.

(51) Int. Cl.  
*H01S 3/22* (2006.01)
(52) U.S. Cl. .................... 372/55; 372/38.01; 372/38.04; 372/38.07; 372/38.09; 372/86
(58) Field of Classification Search .............. 372/38.01, 372/38.04, 38.07, 38.09, 55, 86  
See application file for complete search history.

(56) References Cited

U.S. PATENT DOCUMENTS

| 4,443,877 | A |   | 4/1984  | Chenausky et al. |
| 4,451,766 | A |   | 5/1984  | Angle et al. |
| 4,507,788 | A |   | 3/1985  | Barnie et al. |
| 4,748,634 | A |   | 5/1988  | Hesterman |
| 4,837,772 | A |   | 6/1989  | Laakmann |
| 4,903,276 | A | * | 2/1990  | Ross ........................... 372/82 |
| 5,123,028 | A |   | 6/1992  | Hobart et al. |
| 5,150,372 | A |   | 9/1992  | Nourrcier |
| 5,181,217 | A |   | 1/1993  | Sato et al. |
| 5,247,531 | A |   | 9/1993  | Muller-Horsche |
| 5,313,487 | A |   | 5/1994  | Fujikawa et al. |
| 5,434,881 | A |   | 7/1995  | Welsch et al. |
| 5,556,549 | A |   | 9/1996  | Patrick et al. |
| 5,841,096 | A | * | 11/1998 | Takahashi et al. ....... 219/121.62 |

(Continued)

FOREIGN PATENT DOCUMENTS

DE  10024463 A1  11/2001  
FR  2579382 A1  9/1986

(Continued)

OTHER PUBLICATIONS

International Preliminary Report on Patentability received for PCT Patent Application No. PCT/US2009/043362, mailed on Dec. 9, 2010, 8 pages.

(Continued)

*Primary Examiner* — Yuanda Zhang  
(74) *Attorney, Agent, or Firm* — Morrison & Foerster LLP

(57) ABSTRACT

An RF powered $CO_2$ gas-discharge laser includes discharge electrodes and a lasing gas mixture between the electrode. The lasing gas mixture is ionized when the RF power is applied to the electrodes and laser action is initiated when the RF power has been applied for a duration sufficient to ignite a discharge in the lasing gas mixture. The gas mixture is pre-ionized by periodically applying the RF power to the electrodes for a predetermined period during which ignition of a discharge is not expected to occur. RF power reflected back from the electrodes is monitored. If the monitored power falls below a predetermined level indicative of the imminent onset of laser action before the predetermined duration has elapsed, application of the RF power to the electrodes is terminated to prevent the laser action from occurring.

12 Claims, 6 Drawing Sheets

U.S. PATENT DOCUMENTS

| | | | |
|---|---|---|---|
| 5,892,198 A | 4/1999 | Barnes et al. | |
| 6,135,995 A * | 10/2000 | Arnett et al. | 606/12 |
| 6,181,719 B1 | 1/2001 | Sukhman et al. | |
| 6,392,210 B1 | 5/2002 | Jewett et al. | |
| 6,535,540 B1 | 3/2003 | Kawasuji et al. | |
| 6,693,938 B1 | 2/2004 | Umeda et al. | |
| 6,963,596 B2 | 11/2005 | Shackleton et al. | |
| 6,987,790 B2 | 1/2006 | Govorkov et al. | |
| 7,308,013 B2 | 12/2007 | Basting et al. | |
| 7,366,213 B2 | 4/2008 | Govorkov et al. | |
| 2002/0107510 A1 | 8/2002 | Andrews et al. | |
| 2004/0037339 A1* | 2/2004 | Watson et al. | 372/55 |
| 2005/0058172 A1 | 3/2005 | Paetzel et al. | |
| 2008/0069170 A1 | 3/2008 | Shackleton et al. | |
| 2008/0075640 A1* | 3/2008 | Takeda et al. | 422/186.29 |
| 2008/0204134 A1 | 8/2008 | Knickerbocker et al. | |
| 2009/0067467 A1 | 3/2009 | Gutierrez | |
| 2009/0296764 A1 | 12/2009 | Robotham, Jr. et al. | |
| 2012/0189031 A1* | 7/2012 | Fontanella | 372/55 |

FOREIGN PATENT DOCUMENTS

JP 62-249493 A 10/1987

OTHER PUBLICATIONS

International Search Report and Written Opinion received for PCT Patent Application No. PCT/US2010/051833, mailed on Apr. 12, 2011, 12 pages.

Fontanella, Joel, Unpublished U.S. Appl. No. 12/367,174, filed Feb. 6, 2009, titled as "Gas Laser Discharge Pre-Ionization Using a Simmer-Discharge".

International Search Report received for PCT Patent Application No. PCT/US2009/043362, mailed on Oct. 2, 2009, 3 pages.

Non Final Office Action received for U.S. Appl. No. 12/367,174, mailed on Dec. 30, 2011, 20 pages.

International Preliminary Report on Patentability received for PCT Patent Application No. PCT/US2010/051833, mailed on Apr. 26, 2012, 9 pages.

Final Office Action received for U.S. Appl. No. 12/367,174, mailed on Jul. 20, 2012, 17 pages.

* cited by examiner

FIG. 1A (Prior-Art)

FIG. 1B (Prior-Art)

PRE-IONIZATION METHOD FOR $CO_2$ GAS-DISCHARGE LASER

PRIORITY CLAIM

This application claims priority of U.S. Provisional Application Nos. 61/251,207, filed Oct. 13, 2009 and 61/258,497, filed Nov. 5, 2009, and the complete disclosures of which are hereby incorporated by reference.

TECHNICAL FIELD OF THE INVENTION

The present invention relates in general to carbon dioxide ($CO_2$) gas-discharge lasers including a lasing gas mixture in which a gas discharge is lit to cause laser action. The invention relates in particular to apparatus and methods for pre-ionizing the gas mixture to facilitate reliably lighting the discharge.

DISCUSSION OF BACKGROUND ART

A $CO_2$ laser typically includes spaced apart parallel discharge-electrodes in an enclosure containing the lasing gas mixture. A laser resonator is configured with a longitudinal axis thereof extending between the electrodes. A gas discharge is struck (lit) in the lasing gas mixture by applying RF power usually in the form of RF voltage pulses to the discharge electrodes. This causes the laser resonator to deliver pulses of laser radiation corresponding in duration and frequency to the duration and frequency of the RF voltage pulse. When pulses are being delivered there is sufficient ionization remaining in the mixture following the application of one RF pulse that the next pulse essentially immediately re-lights the discharge for delivery the next pulse.

In a commercially-available pulsed $CO_2$ lasers there is typically some means provided for maintaining some level of ionization in the lasing gas mixture when laser pulse trains are not being delivered. This is commonly referred to as pre-ionization. Pre-ionization facilitates lighting the gas discharge when it is desired to deliver laser pulses. Pre-ionization means are usually configured to minimize any delay between application of the RF pulse power to the electrodes and the delivery of laser pulses. The pre-ionization means should also be configured such that whatever minimum delay remains, that delay is predictable and repeatable.

In early low power lasers for example with less than 100 Watts (W) average power output pre-ionization has been provided by a separate pre-ionization device, not unlike a spark-plug, and operated by a power supply separate from the RF power supply for the discharge electrodes. This method was found to be inadequate for lasers with higher power output. A method referred to as a simmer discharge method has been developed for such lasers. In the simmer discharge method, pre-ionization is created by applying RF pulses, from the main RF power supply of the laser, to the discharge electrodes with a pulse-duration long enough to create free electrons and provide the required ionization, but not long enough to actually light a discharge (plasma) and cause laser action.

A challenge to the development of the simmer discharge method has been to find means of accommodating a difference in load impedance of the discharge that exists between the simmer discharge (pre-ionization) condition and the lit-discharge (lasing) condition. One such means is described in U.S. patent application Ser. No. 12/367,174, filed Feb. 6, 2009, assigned to the assignee of the present invention, and the complete disclosure of which is hereby incorporated by reference. A simmer discharge method in accordance with this description functions reliably in pulsed $CO_2$ lasers having an average output power up to 400 W.

It was found that when attempting to implement this method in pulsed $CO_2$ lasers having an average power output up to 1000 W the pre-ionization-pulse duration that had provided reliable consistent pre-ionization in the lower power lasers sporadically caused unwanted laser action in the higher power lasers. It was also found that because of statistical variations between nominally the same 1000 W lasers, a pre-ionization pulse duration that could provide pre-ionization without unwanted laser action was difficult to predict. This necessitated a time-consuming and costly "calibration" of each laser to determine a specific optimum pre-ionization pulse duration for that laser. Attempting to use a duration short enough to avoid lasing without such calibration led to unreliable discharge ignition. It was found necessary to further develop the pre-ionization method to avoid the conflict between avoiding unwanted laser action and unreliable discharge ignition.

An exemplary description of the operation of the above-discussed prior-art simmer discharge procedure in a gas discharge laser is set forth below with reference to FIGS. 1A and 1B, which each depict voltage as a function of time, and together provide a timing diagram. FIG. 1A illustrates timing of simmer pulses, and FIG. 1B illustrates timing of laser pulses. Before turning on the laser, the simmer discharge is first turned on at a time $t_0$.

Simmer pulse generating circuitry commands an RF Power Supply (RFPS) to emit a RF simmer-pulse train consisting of short RF pulses exemplified in FIG. 1A by pulses $SP_1$, $SP_2$, and $SP_3$. The RF pulses have a width (duration) $W_S$, and a peak voltage V. The pulses are repeated with a time interval T therebetween, i.e., at a pulse-repetition frequency (PRF') equal to 1/T. In this approach the RFPS powers the unlit discharge, i.e., the simmer function, and the lit discharge. The peak voltage V is nominally the same for the lit and unlit discharge conditions. The duration of a simmer pulse is shorter than the duration of a laser pulse and too short to actually cause a lasing discharge. By way of example a simmer pulse may have a duration of about 4 $\mu$s. The simmer pulses precondition the laser gas during a laser warm up period by generating sufficient number of free electrons within the gas between the discharge electrodes. The initial warm up period can be as long as several minutes. The free electrons insure a discharge is quickly ignited when a user command to emit a laser pulse instructs the RFPS to emit an RF pulse having a width (duration) $W_L$ long enough to excite a lasing discharge and emit a laser pulse, for example about 50 microseconds or longer. The period T is selected such there will always be sufficient free electrons during this period to facilitate ignition of a lasing discharge when required.

In FIG. 1B the user command pulse is arbitrarily selected to arrive at time $t_2$, temporally spaced by a duration $t_D$ following the termination of simmer pulse $SP_3$ at time $t_1$. As time $t_D$ is less than the time T between simmer pulses, there are sufficient free electrons in the discharge to promptly ignite the discharge with little time jitter (delay). On receipt of the laser command pulse the simmer pulse command circuitry is disabled. The laser pulse ($LP_1$) is terminated at time $t_3$. If another user command signal is not received before another period T has elapsed following $t_3$, the simmer pulse circuitry is re-activated to cause simmer pulses to be delivered by the RFPS. In FIG. 1B, pulse $SP_4$, represents the first of such pulses. The simmer circuitry commands the RFPS to deliver simmer pulses with period T therebetween until another user command is received to deliver a laser pulse.

The prior-art system described above works very well, but there is always a question about how long a simmer pulse should be for any given laser arrangement. Certainly the duration must excite the gas without causing lasing. Extensive experimentation with a 400 W $CO_2$ slab laser has indicated that a 4 μs pulse as exemplified above satisfied these criteria. However, when the same simmer-pulse width was applied in a 1000 W $CO_2$ slab laser, laser action occurred before the end of the simmer pulse and a small amount of laser power was emitted by the laser when it had not received a signal to do so. Reducing the simmer pulse width to 3 μs is in the 1000 W slab laser appeared to work acceptably, at least in that one particular laser. A problem is that there are statistical variations between lasers in the same model family so it can not be certain that a simmer pulse duration that does not cause lasing in one unit of the family will also not cause lasing in another unit of the family.

While an appropriate simmer-pulse duration for any particular laser can be determined relatively quickly by experiment, this experimental determination adds time and cost to the laser production. Accordingly there is a need for a method and circuitry for delivering simmer pulses that automatically avoids unwanted lasing during delivery of the simmer pulses.

SUMMARY OF THE INVENTION

In one aspect of the present invention, the above discussed conflict is avoided by a method of pre-ionizing the lasing gas mixture comprising initiating application of RF power to the electrodes and monitoring RF power reflected back from the electrodes. When the monitored reflected RF power falls below a predetermined level indicative of the imminent onset of laser action, the application of the RF power to the electrodes is terminated to prevent the laser action from occurring.

In a preferred embodiment a maximum time period that the RF power can be applied without causing laser action is estimated. If the monitored reflected power does not fall below the predetermined value before RF power has been applied for the estimated maximum time period, application of RF power is terminated after the maximum duration has elapsed. In either case, if following termination of the application of RF power, a user of the laser has not commanded laser action to occur, the initiation an termination of the application of RF power to the electrodes is repeated after a time period during which the lasing gas mixture will still be sufficiently ionized to facilitate ignition of a discharge.

DETAILED DESCRIPTION OF THE INVENTION

Figure 2:
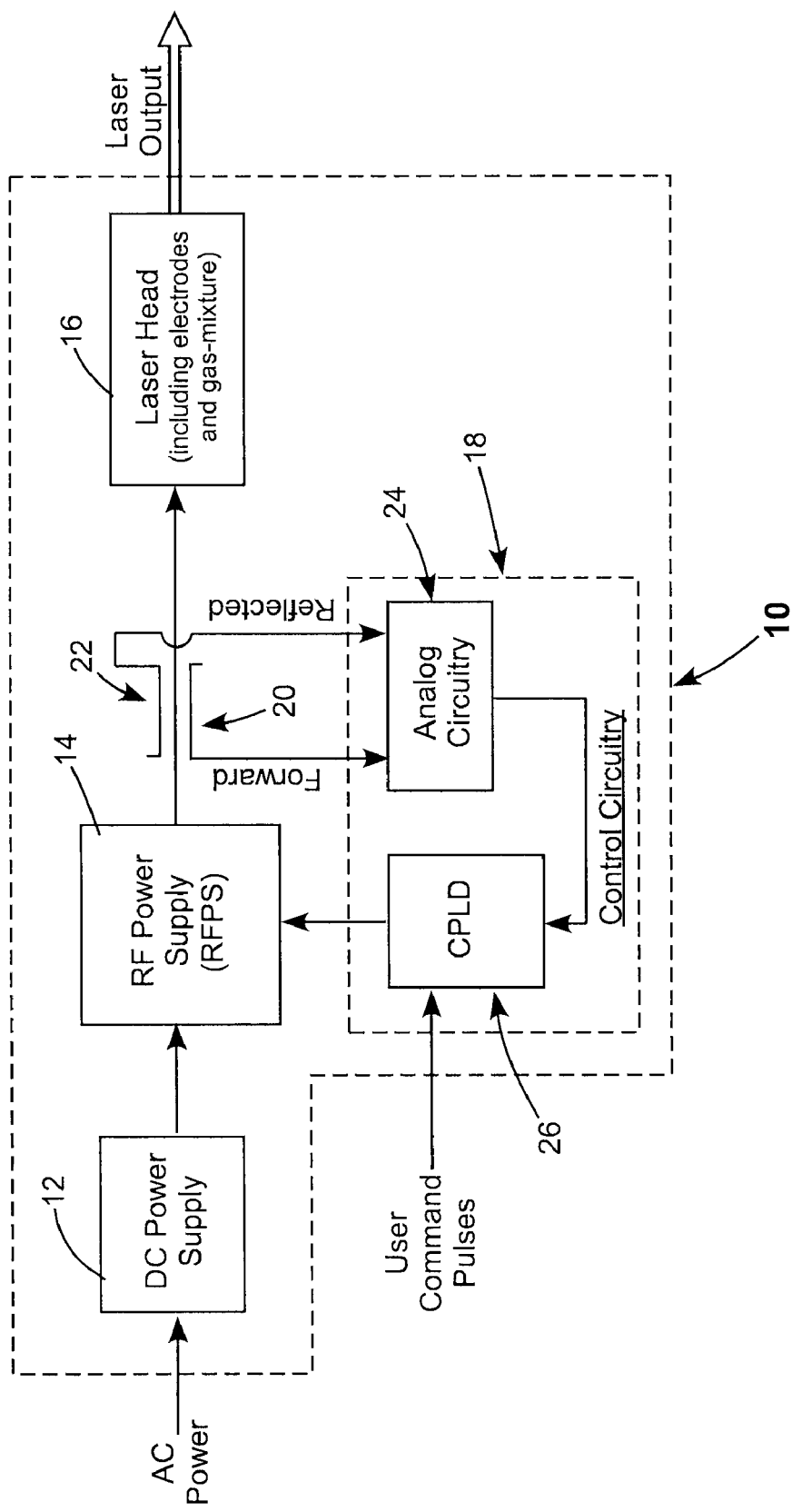
FIG. 2 schematically illustrates a preferred embodiment of laser apparatus in accordance with the present invention including a laser head, an RF power supply for delivering RF power to the laser head, sensors for monitoring RF power delivered to and reflected from the laser head, circuitry for providing from the monitored reflected RF signal a digital signal indicating a drop in the reflected RF signal and a complex programmable logic device (CPLD) configured to terminate delivery of RF power to the laser head on receipt of the digital signal from the sensor circuitry.

FIG. 2 schematically illustrates a preferred basic layout of laser apparatus 10 in accordance with the present invention. Laser 10 has four major subsystems, a DC power supply 12 driven by AC power; and RF power supply (RFPS) 14 driven by the DC power supply; a laser head 16, including (but not shown) discharge electrodes, a lasing gas mixture, and an optical resonator; and electronic control circuitry 18. As the arrangement of RF-excited gas discharge lasers is well-known to those skilled in the art, a detailed description of the laser arrangement is not presented herein.

A forward directional sensor coupler 20 is provided for monitoring the RF energy (power) propagating to the laser electrodes for creating simmer pulses or laser pulses as need. A reverse (backward) directional coupler sensor 22 is provided for monitoring RF power reflected back from the electrodes.

Forward and backward (reflected) signals from the directional couplers are fed to analog circuitry 24 within circuitry 18. Analog circuitry 24 compares the forward and reflected (analog) signals to a threshold and converts changes in the analog signals to corresponding digital signals. The forward signal indicates that the RFPS is delivering RF power to the electrodes (load). A change in the backward signal provides information of the timing of lighting of a discharge between the electrodes. This is described in detail further hereinbelow.

Control circuitry 18 includes a complex programmable logic device (CPLD) 26. A preferred such device is a model EPM3256 available from the ALTERA Corporation of San Jose, Calif. A detailed description of preferred configurations of components of this device is provided further hereinbelow. A user provides ON/OFF commands to the CPLD for starting and stopping delivery of laser pulses. The CPLD processes the digitized reflected RF energy information from circuitry 24 and from the user command inputs and delivers processed user or simmer commands to the RFPS. Based on the input from the CPLD, the RFPS delivers the appropriate RF simmer or operational (laser) pulses to laser head 16.

When the RFPS is turned on either to deliver a circuitry-generated simmer pulse or a laser pulse the reflected RF signal from sensor 22 rises rapidly. This is because at the beginning of the RF pulse, the gas has not yet broken down, and, accordingly the laser behaves as a highly mismatched load. A short time later, the lasing in the laser starts to break down, and the load match begins to improve, causing the reflected RF power to diminish; thereby, causing the signal (voltage) reflected from RF 22 to decrease. The actual time taken for the gas to break down after the RF power is applied depends on the specific configuration of the laser head, including, for example, the gas mixture composition and pressure, the electrode shape and spacing, and "on"-time elapsed since a laser discharge was last activated.

The analog reflected RF signal is digitized by passing the reflected RF signal through a high speed voltage comparator (not shown in FIG. 2) contained within analog circuitry 24, the comparator having a reference voltage, set by the laser manufacturer. When the reflected RF signal is below the set level of the voltage reference, the output of the comparator is digital high. When the reflected signal is above the set reference voltage, the output of the comparator is digital low. The high and low outputs can be referred to as digitized reflected signals.

A summary description of the functioning of circuitry 18 is set forth below with continuing reference to FIG. 2. On first starting of the laser, CPLD 26 turns on a simmer-pulse train for an initial laser warm-up period, which enables the RFPS. The reflected RF signal from the electrodes rises rapidly and is detected by sensor 22. When the signal from the sensor 22 crosses the set level of voltage reference of the comparator within circuitry 24, the signal triggers output of the comparator to go from high to low. In response, the RFPS delivers RF energy into the gas until the gas begins to break down. As the gas begins to break down, the impedance match between the RFPS and the laser improves and the reflected RF correspondingly signal begins to fall. This causes the signal to again cross the reference voltage of the comparator, causing the digital reflected signal to go from low back to high. The low-to-high transition of the digital reflected signal out of the comparator causes the CPLD to terminate the simmer pulse by turning off the RFPS. The CPLD continues to count out a full simmer-repetition period (T in FIGS. 1A and 1B), and then initiates a new simmer pulse if a user command pulse is not received before the ending of a simmer period as illustrated in FIGS. 1A and 1B.

Figure 1:
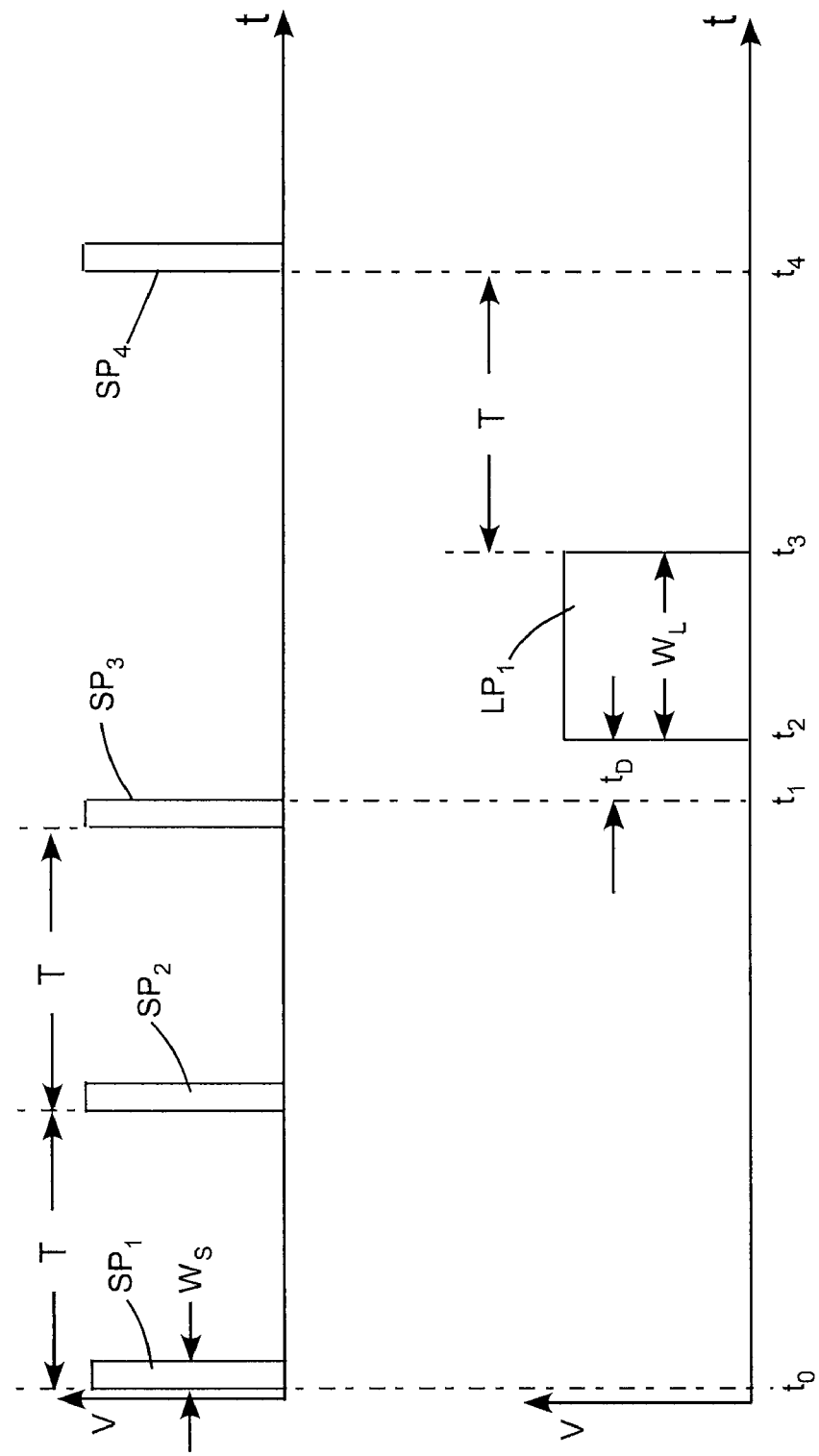
FIGS. 1A and 1B are graphs of RF voltage as a function of time providing a timing diagram schematically illustrating operation of a prior-art scheme for delivering simmer pulses and laser pulses.

It is emphasized here, however, that in contrast with the prior-art arrangement illustrated by FIGS. 1A and 1B, the duration of the simmer pulses is not fixed at a predetermined, clocked time but regulated (terminated) when the signal change from sensor 22 indicates that laser action is imminent, thereby preventing the simmer pulse from actually causing the laser action. In other words the RFPS puts out simmer pulses that are only as long as is needed to begin causing breakdown of the gas. However, because the laser is being driven repeatedly to the point of beginning a lasing discharge, there are enough free electrons in the gas at all times for the laser to start rapidly with low time jitter when pulses are demanded by the user. This inventive method can be referred to as "smart simmer". Since the discharge is never lit in the smart simmer, there is little or no chance of laser action occurring the time the simmer is on.

If the gas fails to begin to break down on application of a simmer pulse from the RFPS, there will not be a drop in the reflected RF signal from the laser head, so it is arranged that the simmer pulse is terminated after some pre-set maximum pulse time. If this occurs, it is an indication that something is wrong with that laser system and it needs to be inspected. Accordingly, smart simmer allows the implementation of a fault signal that operates as follows.

If the lasing gas fails to begin to break down during a simmer pulse, the reflected RF signal will remain high and the simmer pulse will continue for a pre-set maximum time duration, as noted above. This can occur especially during the laser's initial warm up time when the laser discharge is harder to start. It would be impractical to trigger a fault signal after only a single maximum length pulse, because it can be expected that a run of maximum length pulses are needed when the laser is first started "cold". Instead, the smart simmer counts the number of successive maximum length simmer pulses and triggers a fault signal only after the number exceeds some defined limit. For example, if the limit were 1000 maximum length simmer pulses and the simmer pulse PRF were 1 kilohertz (kHz), the fault signal would be triggered after 1 second when the reflected RF signal does not show signs of dropping. As the laser discharge begins to "warm-up", the simmer pulse widths are automatically reduced by the functioning of the analog comparator as discussed above.

Figure 3A:
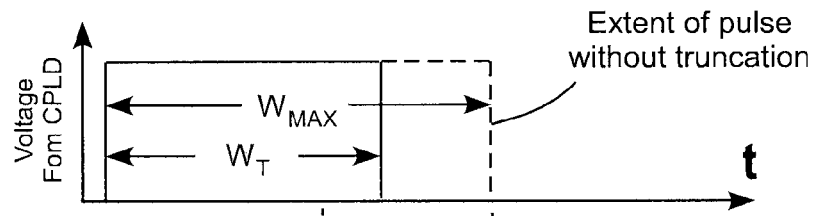
FIGS. 3A, 3B, 3C, and 3D provide a timing diagram schematically illustrating termination of an RF pulse by the CPLD of FIG. 2 in response to receiving the digital signal from the sensor circuitry.

FIGS. 3A, 3B, 3C, and 3D are graphs providing a timing diagram schematically illustrating truncation of a simmer pulse by the above described method. Reference is made in addition to circuit components of FIG. 2. The voltage pulse of FIG. 3A is generated by CPLD 26. The pulse is turned on at time $T_0$ and, in the absence of any truncation (any input from the digitized reflected signal) would be turned off at time $T_5$ as indicated by the dashed portion of the pulse. For a 400 W $CO_2$ slab laser, an un-truncated simmer pulse length ($W_{MAX}$) would typically be between about 2 μs and 4 μs for the above-discussed prior-art simmer system. The pulse of FIG. 3A is applied to command input of RFPS 14 as if it were a standard user command pulse. At the rising edge of the FIG. 3A pulse, the RFPS is turned on, initiating the RF pulse depicted in FIG. 3B.

Figure 3B:
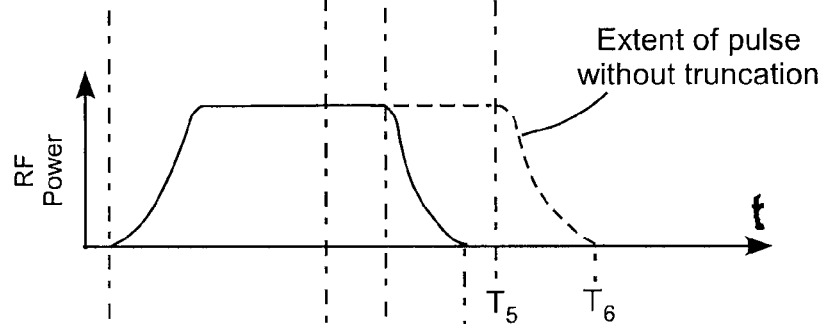
Figure 3C:
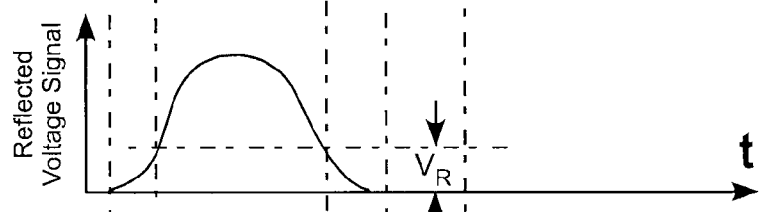

FIG. 3B depicts the envelope of the forward RF power emitted by the RFPS that is propagating toward the laser's electrodes as detected by the forward directional coupler sensor 20. This forward signal informs the user that the RFPS is working properly. Note that the pulse of FIG. 3B follows the shape of the voltage pulse provided to the RFPS (FIG. 3A), except for slower rise and fall times. The reason for the slower rise and fall time is because it takes time for the RFPS to build up to full power when enabled, and time for the RFPS to decay to zero when disabled. Note, here again, in the absence of any truncation the RF pulse would be turned off by the CPLD at time $T_5$ falling to zero at time $T_6$ as indicated by the dashed portion of the pulse FIG. 3C depicts a typical envelope behavior of the reflected RF signal provided by sensor 22. The signal rises initially along with the forward RF signal of FIG. 3C because the laser discharge is initially "unlit". The RFPS is highly mismatched to the load when the discharge is unlit. After a short interval, usually about 0.5 μs in a typical 400 W slab laser, the gas begins to break down and the RF power match between the RFPS and the laser begins to improve, and the reflected signal of FIG. 3C begins to decreases. The horizontal dashed line shown in FIG. 3C is the set reference voltage level whose value is denoted by $V_R$. The reference voltage is set by the laser manufacturer and determined by experimentation for each laser family on which the smart simmer is used.

Figure 3D:
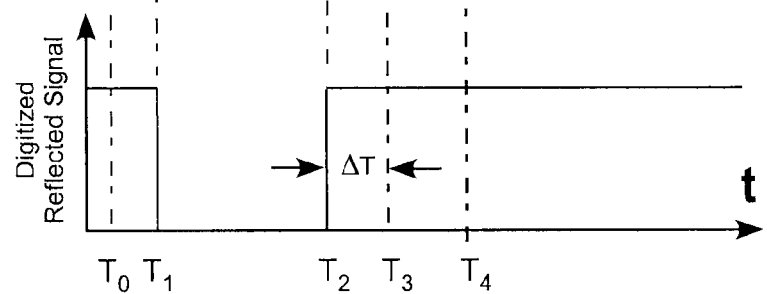

FIG. 3D shows the envelope of the reflected RF signal of FIG. 3C after it is passed through the inverting analog comparator circuit in circuitry 24. When the amplitude of the reflected signal of FIG. 3C is below voltage $V_R$, the output of the comparator is logical high as shown in FIG. 3D. At time $T_1$, the voltage of the reflected signal becomes equal to $V_R$. Once it rises above $V_R$, the output of the comparator switches to a logical low. At time $T_2$, the voltage of the reflected signal has dropped to $V_R$. As soon as the reflected signal falls below $V_R$, the output of the comparator switches to a logical high again. As shown in FIG. 3D, the result is that the digitized reflected signal is an inverted and "squared-up" replica of the reflected signal of FIG. 3C with digital logic levels.

When the digital reflected signal of FIG. 3D transitions from a digital low to a digital high at time $T_2$, it triggers CPLD signal to fall from digital high to digital low as depicted by the solid curve of FIG. 3A. This turns off the RFPS terminating the simmer pulse as indicated by the solid falling edge in FIG. 3B, with the RF voltage falling to zero at time $T_4$. The quick termination (truncation) of the simmer pulse at time $T_2$ prevents laser oscillation during the simmer pulse.

Note that there is some propagation delay $\Delta T$ between the rising edge of the digital reflected signal of FIG. 3D at time $T_2$ and the corresponding falling edge of the simmer pulse of FIG. 3A at time $T_3$. This delay is exaggerated in FIGS. 3A and 3D for convenience of illustration. In practice, this propagation delay can usually be ignored.

Figure 4:
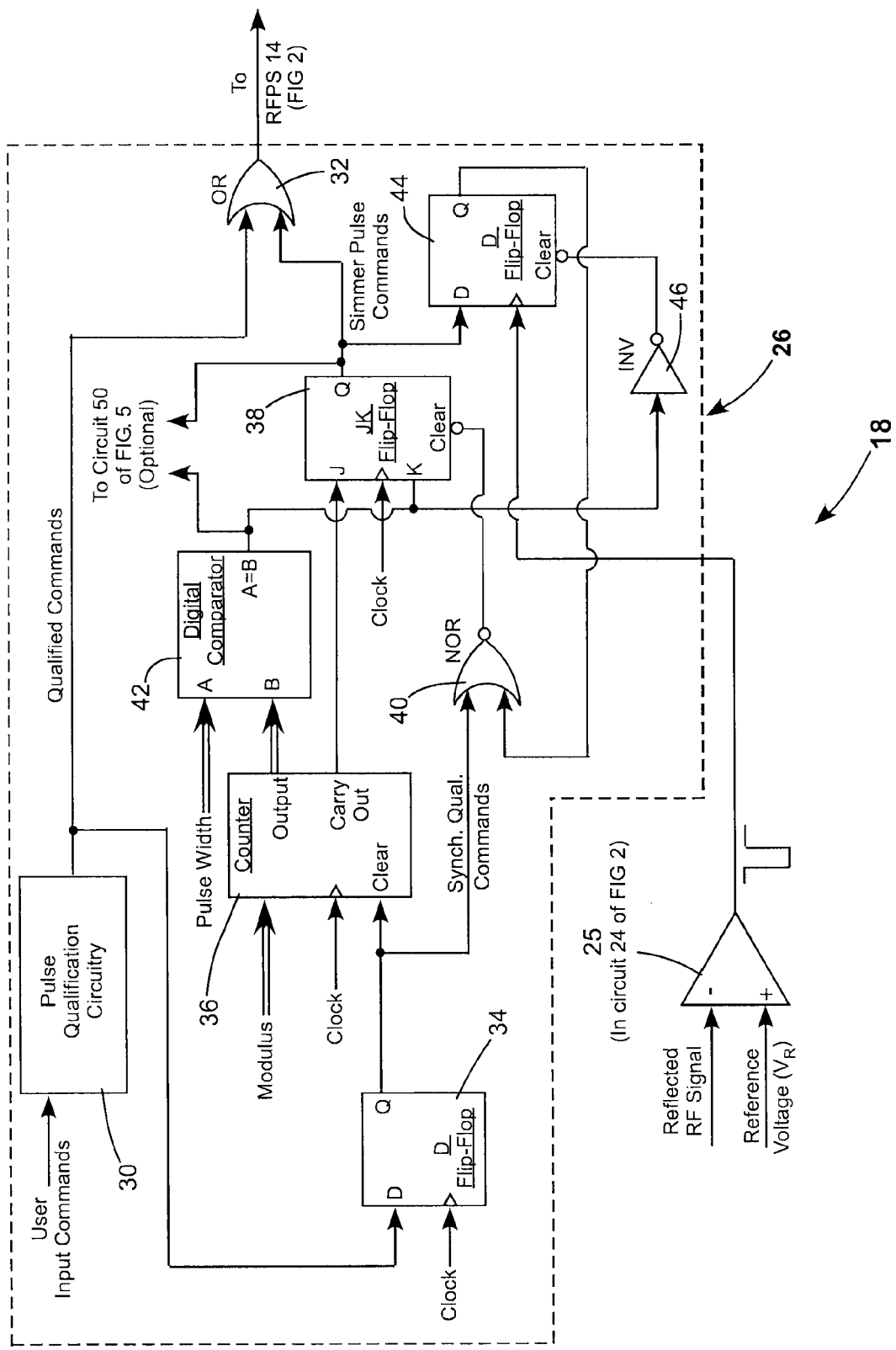
FIG. 4 is a logic circuit diagram schematically illustrating one preferred configuration of the CPLD of FIG. 2.

FIG. 4 schematically illustrates one preferred implementation of circuitry 18 configured for use with a 400 W diffusion-cooled $CO_2$ slab laser. Circuitry enclosed by the dashed line is circuitry of CPLD 26 implemented by configuring an above-referenced Altera EPM3256 CPLD integrated circuit chip. Analog comparator 25 is part of analog circuitry 24 of FIG. 2. A high speed analog comparator model LMV7219-10, available from National Semiconductor Inc. of Santa Clara, Calif., was used in this implementation. The reflected signal and the reference voltage ($V_R$) signals (see FIG. 3C) for the reference voltage setting on the analog comparator are applied to the inverted (−) and non-inverted (+) input terminals of comparator 25 as depicted.

The user command signals are first passed through a pulse qualification circuit 30 which limits the duty cycle and the maximum pulse width of the user commands. The purpose of pulse qualification circuit 30 is to prevent a user from operating the RFPS and the laser head outside of specified operational ranges which, if exceeded, could lead to damage to the RFPS or the laser head. A detailed description of the pulse qualification circuitry is not necessary for understanding principles of the present invention and accordingly is not presented herein.

The signal from qualification circuit 30 is provided to an OR-gate 32 and then to RFPS 14 of FIG. 2. The qualified command signal is also synchronized to the system clock by means of a D flip-flop 34. This synchronous qualified command signal is used to clear a counter 36 and, via a NOR-gate 40, a JK flip-flop 38 which produces simmer pulse commands that are fed to OR-gate 32. This allows the user commands to override and inhibit the simmer until a user command signal has been absent for a whole simmer period.

A simmer pulse is generated as follows. Counter 36 has a predetermined "modulus" parameter depicted by double input lines. Every clock cycle, the counter counts up by 1, until it reaches a count of modulus −1, i.e. one less than the modulus parameter. At this count, the carry out signal from counter 36 goes to logic 1. On the next clock cycle, counter 36 returns to a count of zero, and the carry out goes back to logic 0. By way of example, if the clock has a frequency of 1 MHz, and the modulus is 1000. On the count of 999, carry out goes to logic 1; on the next count, the counter counts from 999 to 0, and carry out goes to logic 0. Accordingly the carry out of counter 36 will emit output pulses at a rate of 1 Megahertz/ 1000, i.e., 1 kHz.

The carry out of the counter 36 is applied to the J input of the JK flip-flop 38. As noted, carry out is at logic 1 when the count=999. On the next clock cycle, counter 36 counts to 0, and the output of JK flip-flop 38 goes to logic 1 (because a JK flip-flop will set when clocked and J=1 and K=0). This marks the beginning of the simmer pulse command signal. The simmer pulse command passes through OR-gate 32 to RFPS14 of FIG. 2, thereby turning on the RFPS to initiate a simmer pulse.

Output bits of counter 36 are fed into the B input of a digital comparator 42 as indicated by the double lines feeding terminal B. Another input (again indicated by double lines) is applied to terminal A of the digital comparator. This input signal is set to a CPLD-defined parameter which defines the maximum pulse width of the simmer pulse. The actual maximum pulse width is the applied pulse-width parameter plus 1. By way of example, with a 1 MHz clock, if a maximum pulse width of 5 μs is desired, the pulse parameter should be set to 4. When the output of the counter is equal to the value of the pulse width parameter (A=B), the output of digital comparator 42 goes to logic 1. On the next clock cycle, the output of JK flip-flop 38 goes to logic 0 (because a JK flip-flop will clear when clocked and J=0 and K=1). This marks the end of the simmer pulse. The command out signal goes to logic 0, and the RFPS is turned off.

The description of a simmer pulse generation provided above assumes there has been no change in the detected reflected RF signal from the laser head. Set forth below, with continuing reference to FIG. 4. is a description of what happens when certain changes in the RF feedback signal are detected from the laser head.

When the simmer pulse begins and the RFPS is turned on, the reflected RF signal begins to rise, as described above with reference to FIG. 3C. This signal is applied to the inverting (−) input of high speed analog comparator 25. When the reflected RF signal exceeds the selected reference voltage $V_R$, the output of comparator 25 goes to logic 0. This causes no change in the state of the logic circuits because the digital reflected signal out of the comparator feeds a positive-edge-triggered clock-input of a D flip-flop 44. A short time later, the laser gas begins to break down, and the reflected RF signal begins to fall. When the reflected RF signal falls below the reference voltage $V_R$, the output of analog comparator 25 goes to logic 1. The rising edge of the digital reflected signal clocks the D flip-flop 44. The D input of the flip-flop is at logic 1 (because it is connected to the simmer pulse from JK flip-flop 38), so the output of the D flip-flop 44 goes to logic 1. The output of the D flip-flop 44 is applied to one input of NOR-gate 40, causing the output of the gate to go to logic 0. This, in turn, causes an asynchronous, i.e., un-clocked, clearing of JK flip-flop 38. Because of this, when the digitized reflected RF signal out of the analog comparator 25 falls, the simmer pulse is caused to be terminated prematurely, The A=B output of digital comparator 42 is also provided to the input of an inverter 46, the output of which is provided to the "clear" input of the D flip-flop 44.

It should be noted here that the clearing of the simmer pulse does not affect the behavior of counter 36. Counter 36 continues to count up until the counter outputs are equal to the pulse width parameter signal provided to terminal A of digital comparator 42. The output of digital comparator 42 again goes to logic 1. JK flip-flop 38 is not cleared in this case, because it has already been cleared by the reflected RF signal, as described. However, D flip-flop 44 is asynchronously cleared so that the simmer circuit will be ready to generate another simmer pulse during the next simmer period.

After configuring the Altera EPM3256 CPLD integrated circuit chip as described above, it was determined that there were enough unused circuit devices remaining within the CPLD to implement a fault detection circuit. A description of one preferred implementation 50 is set forth below with reference to FIG. 5 and with continuing reference to FIG. 4 and FIG. 2.

Fault detection circuit 50 will generate a digital fault signal if above-described circuitry 26 has been generating full-length, un-truncated pulses for some pre-determined period of time. This will occur if the laser gas shows no evidence of beginning to light during the simmer pulse as indicated by the failure of the reflected RF signal from sensor 22 of FIG. 2 to drop. When this happens, the digitized reflected RF analog signal remains high during the entire simmer pulse, and the output of the analog comparator 25 remains at logic low. Because of this, JK flip-flop 38 is not cleared prematurely, and the simmer pulse runs for the preset maximum duration. When the output of counter 36 is equal to the pulse-width parameter, the output of digital comparator 42 goes to logic high, and JK flip-flop 38 is reset on the following clock cycle.

Figure 5:
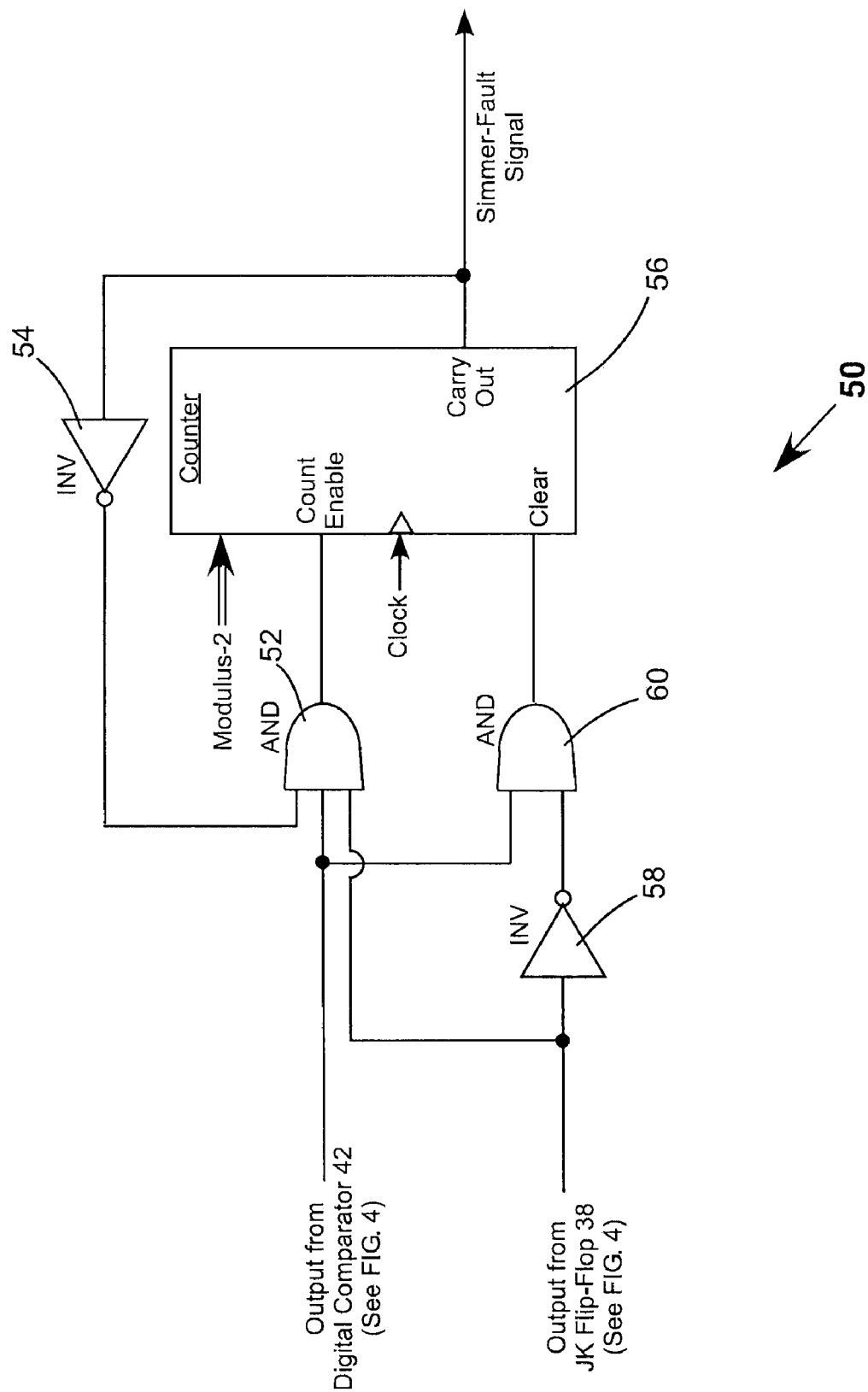
FIG. 5 is a fault detection circuit optionally usable with the CPLD configuration of FIG. 4 for providing a fault signal if the digital signal of FIG. 2 has not been received for a predetermined time.

The outputs from digital comparator 42 and JK flip-flop 38 of FIG. 4 are also applied to fault detection circuit 50 as shown in FIG. 5. If the output of JK flip-flop 38 of FIG. 4 is high when the output of digital comparator 42 of FIG. 4 goes high, this indicates a fault condition for this particular simmer pulse. In circuit 50, these two signals are applied to the inputs of a 3-input AND-gate 52, together with the signal from an inverter 54, the input of which provided from the carry-out of a counter 56. A modulus parameter (modulus-2) is applied to counter 56. Modulus-2 defines a predetermined maximum number of full-length simmer-cycles that can be tolerated before a fault is suspected.

If counter 56 is below this predetermined maximum (Modulus-2 minus 1), the inverted carry-out output of counter 56 will be logic high, and the output of 3-input AND-gate 52 will also be logic high. Consequently, the count-enable input of counter 56 will be at logic high, and the counter will count up by one on the next clock cycle.

If the count of full-length simmer-cycles exceeds the predetermined maximum, the carry-out output from counter 56 goes to logic high, asserting a simmer-fault signal. The simmer fault signal can be provided to a fault indicator, such turning on a light, or turning off the RFPS, or the like, thereby informing the user that something may be wrong with the laser system and that inspection thereof may be appropriate. The carry-out signal is also inverted by inverter 54, causing the output of 3-input AND-gate 54 to be forced to the low state, and disabling further counting by counter.

If, however, during the delivery of any simmer pulse a discharge begins to ignite, the simmer pulse will be truncated (as described above), and at the time that the output of the digital comparator 42 of FIG. 4 goes to logic high, and the output of JK flip-flop 38 will be at logic low. This output is inverted in circuit 50 of FIG. 5 by an inverter 58, and applied to a 2-input AND-gate 60, together with the output from the digital comparator 42 of FIG. 4. The output of 2-input AND-gate 60 goes to logic high, and counter 56 is cleared back to a "zero" state. This will also clear a simmer-fault signal, if such has been asserted.

A shortcoming of the version of the circuitry of FIG. 4 is that if the reflected RF feedback signal is lost for any reason, for example a poor connection, insufficient amplitude, or the like, the circuitry will continue to cause RF pulses having the maximum pulse width defined in the circuit to be generated. If such a condition occurs, RF energy will continue to be pumped into the laser head, which is wasteful, and may cause unintended lasing.

Figure 6:
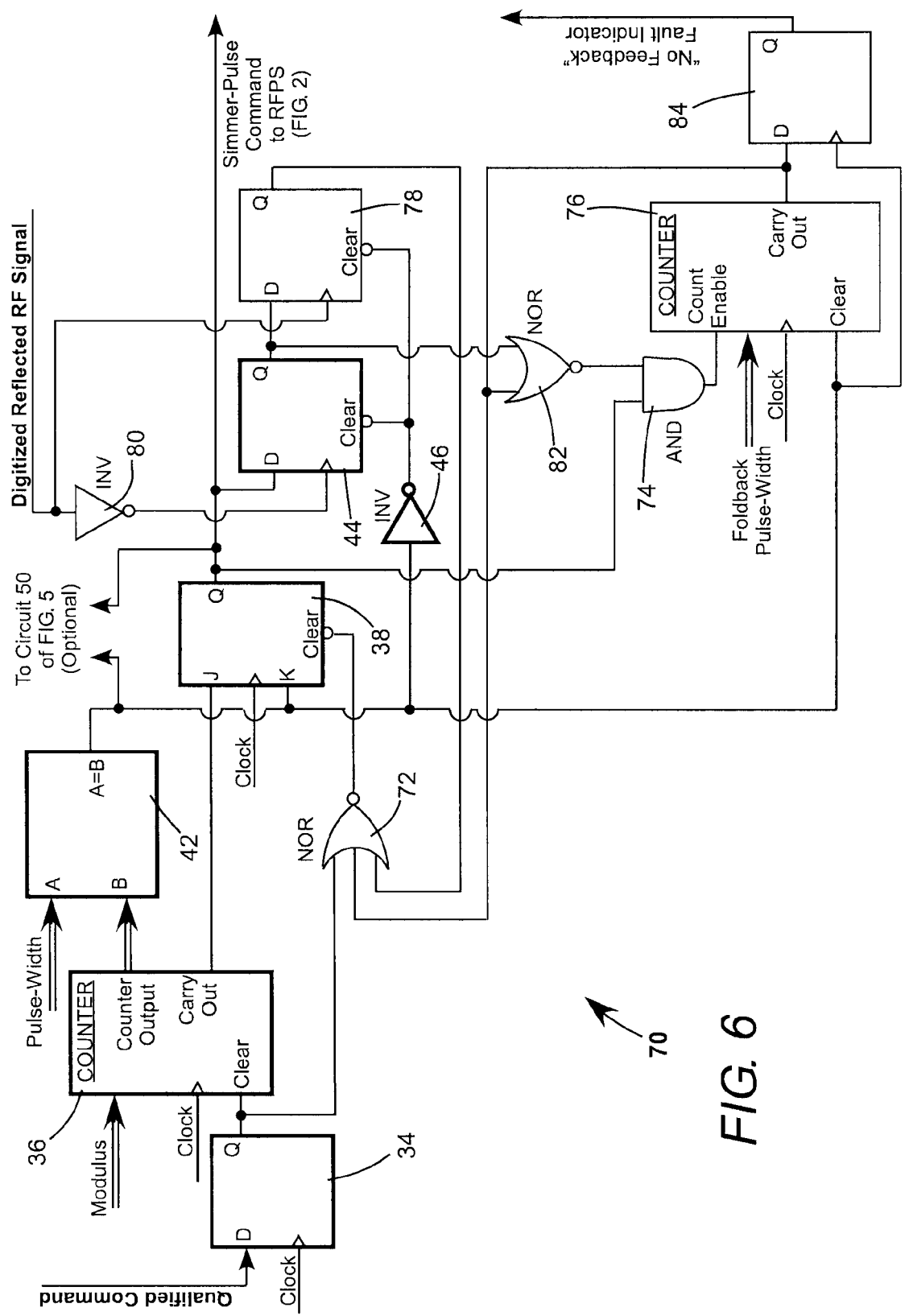
FIG. 6 is a logic circuit diagram schematically illustrating another preferred configuration of the CPLD of FIG. 2, having the functionality of the configuration of FIG. 4, but additionally providing a fault signal if no reflected RF signal is detected by the sensor circuitry of FIG. 2.

Set forth below with reference to FIG. 6, and with continuing reference to FIG. 4, is a description of alternative circuitry 70 that informs a user when this is happening and shortens up the simmer-pulse widths to a minimum value in order to prevent unwanted laser action from occurring, while retaining all of the functionality of the circuitry of FIG. 4. The circuitry of FIG. 6 can also be configured in the ALTERA EPM3256 CPLD device. For convenience of description and comparison, components of circuitry 60 functionally equivalent of those of the circuitry 18 of FIG. 4 are designated by the same reference numerals and outlined by bold lines. The pulse qualification circuit 30 of circuitry 18 for delivering qualified user commands, and analog comparator 25 of circuitry 18, are not shown in FIG. 6. The outputs of those items, however, are explicitly designated in bold type.

In circuitry 70, simmer-pulse commands are generated exactly as in circuitry 18 of FIG. 4 by counter 36, digital comparator 42, JK flip-flop 38, D flip-flops 34 and 44, and inverter 46. However, two-input NOR-gate 40 in circuitry 18 of FIG. 4 is replaced in circuitry 70 of FIG. 6 by three-input NOR-gate 72. This replacement is needed because there are now three conditions which can cause truncation of a simmer pulse. These are: receipt of a qualified user command signal and detection of the onset of laser action as in circuitry 18; and detection of loss of a reflected RF signal, which is an added feature of circuitry 70.

When the laser is functioning normally, a simmer pulse starts when JK flip-flop 38 is set by the carry-out output of counter 36. The beginning of the simmer pulse enables, via an AND-gate 74, a counter 76, and this counter begins counting the elapsed time from the beginning of the simmer pulse.

At this point, D flip-flops 44 and 78 are both in logic state 0. Sometime later, reflected RF power is detected by sensor 22 of FIG. 2, and the digitized reflected signal transitions from 1 to 0. This transition is inverted by an inverter 80, clocking D flip-flop 44, which goes to state 1. This causes the output of a two-input NOR-gate 82 to go to 0, thus causing AND-gate 74 to go to 0, disabling Counter 76.

After the simmer pulse has been applied to the laser for a sufficient period of time, the onset of laser ignition occurs, the reflected RF signal falls, and the digital reflected signal transitions from 0 to 1. This transition clocks D flip-flop 78, which goes to logic state 1. This state is transmitted through NOR-gate 72, clearing JK Flip-Flop 16, and truncating the simmer pulse, as in the previously-described circuit. Counter 36 continues to count, however, and after the maximum simmer pulse time has elapsed, the output of the counter equals the pulse width parameter, and the output of digital comparator 42 goes to logic state 1 for one clock cycle. This clears D flip-flops 44 and 78 through inverter 46.

If no digitized reflected signal is received, JK flip-flop 38 is set, as before, and counter 76 begins to measure the elapsed time since the beginning of the pulse. D Flip-Flops 44 and 78 will remain in logic state 0, because the digitized reflected signal is stuck in logic state 1. Counter 76 will count up until the count is one less than a parameter "foldback pulse width", which is the modulus of counter 76.

The foldback pulse-width parameter defines a time period which is significantly less than the pulse width parameter (the modulus of counter 36) which defines the maximum contemplated simmer pulse width. This time period is selected to be sufficiently short that laser action cannot possibly occur and greatly reduces input of RF energy to the laser. Preferably the foldback pulse width parameter should be between about 10% and about 50% of the maximum-contemplated pulse width of a simmer pulse. By way of example, for a maximum contemplated simmer pulse width of 8 μs, the foldback pulse-width may be 2 μs. When the count in counter 76 reaches one less than the foldback pulse-width parameter, the carry-out output of counter 76 goes to logic state 1, the output of NOR-gate 72 goes to logic state 0, and JK flip-flop 38 is cleared, truncating the simmer pulse. At the same time, counter 76 is disabled by the carry-out signal propagating through NOR-gate 82 and AND-gate 74. This allows counter 76 to "remember" that it reached its maximum count. Counter 76 is then cleared by the output of digital Comparator 42 when the output thereof goes to logic 1 at the end of the normal simmer pulse cycle. This allows counter 76 to be ready to begin counting from zero at the beginning of the next simmer pulse cycle.

If the output of counter 76 is at logic 1 at the time of the reset pulse from digital comparator 42 (indicating that a pulse was truncated due to the absence of the reflected RF feedback signal) a D flip-flop 84 will go to logic 1, and from the output of this flip flop is delivered a "no feedback" fault signal, which can be asserted as desired. If the output of counter 76 is at logic 0 at the time of the reset pulse, D flip-flop 84 will go to logic 0, and the "no feedback" fault signal will not be delivered.

In conclusion, the present invention is described above with reference to two examples of programmed logic circuitry. In the example of FIG. 4 the circuitry terminates a simmer pulse when a change in a detected reflected RF signal indicates the onset of laser action during delivery of the pulse. The circuitry of FIG. 6 has all of the functionality of FIG. 4 but additionally, if no reflected RF signal is detected, is able to significantly reduce RF energy delivery to the laser and deliver a signal alerting a user to the problem or be asserted in some other way. Auxiliary circuitry is described with reference to FIG. 5 which can deliver a fault signal if a certain number of simmer pulses is delivered without the onset of laser action being detected. The fault detection circuitry of FIG. 5 may be used with both the circuitry of FIG. 4 and the circuitry of FIG. 6. Those skilled in the art will recognize that each of the circuits described is merely one example of such a circuit. Those skilled in the art may devise other circuits having similar functionality without departing from the spirit and scope of the present invention.

In summary, the present invention described above is described with reference to preferred embodiments. The invention, however, is not limited to the embodiments described and depicted herein. Rather, the invention is limited only by the claims appended hereto.

What is claimed is:

1. In an RF powered gas-discharge laser, including discharge electrodes and a lasing gas mixture between the electrodes, the lasing gas mixture being ionized when the RF power is applied to the electrodes and laser action being initiated when the RF power has been applied for a duration sufficient to ignite a discharge, a method of pre-ionizing the lasing gas mixture with a series of simmer pulses, comprising the steps of:
   applying a pulse of RF power to the electrodes to generate a simmer pulse;
   monitoring RF power reflected back from the electrodes during the application of the RF power pulse;
   repeating the applying and monitoring steps after a predetermined time period to generate a series of simmer pulses;
   and
   whenever the reflected RF power monitored during the application of the RF power pulses falls below a predetermined level indicative of the imminent onset of laser action, terminating the application of the RF power to the electrodes to prevent the laser action from occurring.

2. The pre-ionizing method of claim 1, further including the steps of determining a maximum time period during which the RF power can be applied to the electrodes without expecting laser action to occur, and if the monitored reflected RF power does not fall below the predetermined level indicative of the imminent onset of laser action before the maximum time period has elapsed, terminating the application of the RF power after the maximum time period has elapsed.

3. In an RF powered gas-discharge laser, including discharge electrodes and a lasing gas mixture between the electrodes, the lasing gas mixture being ionized when the RF power is applied to the electrodes and laser action being initiated when the RF power has been applied for a duration sufficient to ignite a discharge, a method of pre-ionizing the lasing gas mixture, comprising the steps of:
   (a) determining a maximum time period during which the RF power can be applied to the electrodes without expecting laser action to occur;
   (b) initiating application of RF power to the electrodes;
   (c) monitoring RF power reflected back from the electrodes;
   (d) if before RF power has been applied to the electrodes for the maximum time period the monitored reflected RF power falls below a predetermined level indicative of the imminent onset of laser action, terminating the application of the RF power to the electrodes before the maximum time period has elapsed to prevent the laser action from occurring, else terminating the application of the RF power to the electrodes when the maximum time period has elapsed;
   (e) repeating steps (b), (c), and (d) a predetermined number of times with a predetermined time between repetitions; and
   (f) if the monitored reflected power does not fall below the predetermined level indicative of the imminent onset of laser action during any of the repetitions of steps (b), (c) and (d), providing a fault-signal indicating that this is the case.

4. In an RF powered gas-discharge laser, including discharge electrodes and a lasing gas mixture between the electrodes, the lasing gas mixture being ionized when the RF power is applied to the electrodes and laser action being initiated when the RF power has been applied for a duration sufficient to ignite a discharge, a method of pre-ionizing the lasing gas mixture, comprising the steps of:
   (a) determining a first maximum time period during which the RF power can be applied to the electrodes without expecting laser action to occur;
   (b) estimating a second maximum time period during which the RF power can be applied to the electrodes without initiating laser action, the second maximum time being significantly less than the first maximum time period;
   (c) initiating application of RF power to the electrodes;
   (d) monitoring RF power reflected back from the electrodes;
   (e) if no RF power is monitored during step (d), terminating the application of the RF power to the electrodes when the second maximum time period has elapsed, repeating steps (c), (d), and (e), with a first predetermined interval between repetitions, and providing a first fault signal indicating that no reflected RF power has been monitored; else
   (f) if before RF power has been applied to the electrodes for the first maximum time period the monitored reflected RF power falls below a predetermined level indicative of the imminent onset of laser action, terminating the application of the RF power to the electrodes to prevent the laser action from occurring, else terminating the application of the RF power to the electrodes when the first maximum time has elapsed.

5. The pre-ionizing method of claim 4, further including, following step (f) the step of (g) repeating steps (c), (d) and (f) a predetermined number of times with a predetermined time interval between repetitions, and if the monitored reflected power does not fall below the predetermined level indicative of the imminent onset of laser action during any of the repetitions of steps (c), (d) and (f), providing a second fault-signal indicating that this is the case.

6. A gas discharge laser apparatus, comprising:
a laser head including discharge electrodes and a lasing gas mixture between the electrodes;
an RF power supply for supplying RF power to the electrodes for exciting the lasing gas mixture therebetween;
a sensor for monitoring RF power reflected back from the electrodes as a result of an impedance mismatch between the RF power supply and the electrodes; and
control circuitry cooperative with the reflected RF power monitor and arranged to repeatedly initiate and terminate RF power delivery to the electrodes by the RFPS for providing simmer-pulses for pre-ionizing the lasing gas mixture, said control circuitry being arranged to terminate a simmer pulse when the reflected RF power monitor detects a fall in the reflected RF power below a predetermined level indicative of the onset of laser action in the laser head.

7. The apparatus of claim 6, wherein the control circuitry is further arranged to terminate a simmer pulse after a predetermined first maximum time period has elapsed if the fall in reflected RF power is not detected within that first maximum time period.

8. The apparatus of claim 7, wherein the control circuitry is further arranged such that if a predetermined number of simmer pulses terminated after the first maximum time period are consecutively delivered, the control circuitry delivers a fault signal indicating that this is the case.

9. The apparatus of claim 7, wherein the control circuitry is also arranged such that if the reflected RF power monitor does not detect any reflected RF power after initiating of RF power delivery to the electrodes, the simmer pulses are terminated after a second maximum time period has elapsed, the second maximum time period being significantly less than the first maximum time period.

10. The apparatus of claim 9, wherein the second maximum time period is between about 10% and about 50% of the first maximum time period.

11. The apparatus of claim 9, wherein the control circuitry is also arranged such that if the reflected RF power monitor does not detect any reflected RF power after initiating of RF power delivery to the electrodes the control circuitry delivers a "no feedback" signal to indicate that this is the case.

12. The apparatus of claim 9, wherein the control circuitry is further arranged such that if a predetermined number of simmer pulses terminated after the first maximum time period are consecutively delivered the control circuitry delivers a fault signal indicating that this is the case.

* * * * *